United States Patent [19]

Hara et al.

[11] 4,171,973
[45] Oct. 23, 1979

[54] DIAMOND/SINTERED CARBIDE CUTTING TOOL

[75] Inventors: Akio Hara; Shuji Yazu, both of Itami, Japan

[73] Assignee: Sumitomo Electric Industries, Ltd., Osaka, Japan

[21] Appl. No.: 902,812

[22] Filed: May 4, 1978

[30] Foreign Application Priority Data

May 4, 1977 [JP] Japan .................................. 52-51381
Feb. 28, 1978 [JP] Japan .................................. 53-22333

[51] Int. Cl.² ........................ B24D 3/04; C22C 29/00
[52] U.S. Cl. ..................................... 75/237; 51/307; 75/241; 75/242
[58] Field of Search ........................ 75/237, 241, 242; 51/307

[56] References Cited

U.S. PATENT DOCUMENTS

| | | | |
|---|---|---|---|
| 1,904,049 | 4/1933 | Hoyt | 51/307 X |
| 3,136,615 | 6/1964 | Bovenkerk et al. | 51/307 |
| 3,372,010 | 3/1968 | Parsons | 51/307 X |
| 3,399,254 | 8/1968 | Dunnington | 51/307 X |
| 3,663,475 | 5/1972 | Figiel | 51/307 X |
| 3,767,371 | 10/1973 | Wentorf et al. | 51/307 |
| 3,785,093 | 1/1975 | Vereschagin et al. | 51/307 |
| 3,944,398 | 3/1976 | Bell | 51/307 |
| 4,084,942 | 4/1978 | Villalobos | 51/307 |

*Primary Examiner*—Richard E. Schafer
*Attorney, Agent, or Firm*—Wenderoth, Lind & Ponack

[57] ABSTRACT

A sintered compact for use in a cutting tool and a method of producing the same are disclosed. The compact comprises 95 to 20 volume % of diamond finer than one micron in size and the balance binder also finer than one micron selected from the group of WC, (MoW)C, WC base cemented carbide and (MoW)C base cemented carbide.

The method comprises pulverizing a diamond powder by using cemented carbide balls and a pot having a cemented carbide lining, mixing the diamond powder with a powder abraded from the balls and pot to produce a powder mix finer than one micron containing 95 to 20 volume % of diamond, heat-treating the powder mix in vacuum so as to degas, and hot-pressing the powder mix under high pressure at high temperature within the stable range of diamond.

5 Claims, 12 Drawing Figures

DIAMOND/SINTERED CARBIDE CUTTING TOOL

The present invention relates to a sintered compact for use in a cutting tool and a method of producing the same.

A material which comprises a sintered compact containing more than 90 volume % of diamond with a binder metal mainly composed of cobalt, and a cemented carbide substrate having the sintered compact integrally bonded thereto is sold at the market for use in a cutting tool for cutting a nonferrous alloy, synthetic resin, ceramics and the like. Although the material is expensive, it is highly estimated by some people for cutting aluminium alloy containing relatively large amount of silicon, copper alloy having high hardness or the like.

The present inventors have examined various properties of this tool material. When a cutting tool was formed by the material and was actually used in cutting, it was assured that the material is much more excellent than a conventional cemented carbide tool in respect to wear resistance, and is more advantageous in toughness against shock as compared to a tool formed from a single crystal natural diamond.

On the other hand of these advantages, after cutting, for example, a nonferrous alloy, a machined surface thereof was examined to be found that the surface is rougher than the case in which a single crystal natural diamond tool is used. Therefore, the material is not suitable for machining a workpiece which should be finished specially smoothly.

Further, when a smaller workpiece such as watch element or a thinner workpiece was cut, there occured such a problem that the workpiece is deformed or a dimension precision cannot be maintained due to the heavy cutting resistance. As a result of the study, the following reasons were revealed.

FIG. 1 is a microphotograph showing a cutting edge of a cutting tool formed by a marketed ultrafine WC (tungsten carbide)-Co cemented carbide. FIG. 2 is a microphotograph showing a cutting edge of a cutting tool formed from a marketed sintered diamond compact. As seen from the photographs, the cutting edge of the tool from the marketed diamond compact is not sharp and straight, but has numerous fine chippings. The material was formed into a cutting tool by using a diamond grinding wheel. However, since the diamond wheel has a high grinding resistance when grinding the diamond compact, and soon clogs with swarf to become dull, it is difficult to machine the material into a sharp cutting tool.

FIG. 3 is a microphotograph showing a commercially available diamond compact which has such a structure that the diamond particles having a particle size from 3 to 10 micron are in contact to one another. When the diamond compact having the particle size of this range is ground by a diamond wheel, the diamond particles at a cutting edge are broken, and a sharp edge is not obtained. Particularly, if a cutting edge is to be of a shape such that the cutting edge angle formed by the rake face and flank has a positive rake angle less than 90°, it is impossible to obtain a satisfactory cutting edge from the marketed diamond compact.

One of the tool materials of marketed diamond compacts contains diamond particles more than about 60 micron in size, as shown in FIG. 4. This is mainly used as a material for a wire drawing die.

The inventors have examined the properties as a wire drawing die in respect to this sintered compact having coarser particle size. Several examples taught us that the wear resistance is considerably improved when the die of this material is used in the work to which a conventional cemented carbide die is applied. However, the experiments also revealed several problems, one of which is that scratches remain on the surface of a wire. FIGS. 5 and 6 show such examples. FIG. 5 shows the surface condition of a copper wire with a diameter of 0.5 mm which is produced by a die of a single crystal natural diamond. FIG. 6 shows the surface condition of the same wire which is produced by a die of the marketed diamond compact. As apparent from the photographs, there are many scratches on the surface of a wire which is drawn by the die of the marketed diamond compact. In order to investigate the cause, the inner periphery of the die is examined after drawing a wire. As shown in FIG. 7, a part of diamond particles is destroyed to be torn off. The deficient portion may bite a wire to be drawn, thus causing scratches.

The inventors have made various studies so as to develop a novel tool material of sintered diamond compact which eliminates the defects in the conventional sintered diamond compact, and have obtained an idea that the defects might be obviated by using a diamond powder having a very fine particle size. According to the idea, the inventors have made a sintered diamond compact on trial.

For producing a sintered diamond, there is a process in which a diamond powder mixed with a powder such as iron group element which can dissolve diamond is hot-pressed at high temperature under high pressure in the stable region of diamond, as disclosed, for example, in the official gazette of Japanese Patent Publication No. 39-20483. The inventors have tried to make a compact by sintering a mix of diamond powder with particle size less than one micron and carbonyl nickel powder under super-pressure. A densely concentrated compact was obtained. However, as a result of examination of the structure of the compact, an abnormal growth of diamond crystals was observed all over the structure, and there were number of particles having a particle size more than 500 micron. The inventors have made experiments by varying the particle size of diamond powder as well as conditions of temperature and pressure upon sintering. As a result, it was found that when a particle size of diamond powder is more than 3 micron, the abnormal crystal growth will not occur, and dense structure can be obtained, while if a particle size is less than one micron, the crystal growth always occurs under the conditions which allow the production of dense structure. That is, according to the method, a structure containing fine and uniform particles of diamond cannot be obtained.

There is an another method which is disclosed in Japanese Patent Publication No. 52-12126. The method is thought to be a process of producing the commercially available diamond compact at present. According to the method, a diamond powder is put on a cemented carbide substrate in a cup, and is sintered at high temperature under high pressure to cause a liquid phase of Co-W-C eutectic mixture produced from the substrate to permeate into the diamond powder.

The inventors have tried to produce a compact by sintering under super-pressure a diamond powder of less than one micron which is put on a WC-6% Co cemented carbide disk in a cup. The interface between the obtained sintered compact and the cemented carbide substrate was examined to be found that there are many particles which abnormally grows to several hundred micron.

Further, the sintering conditions were varies, but the abnormal crystal growth was always observed under the conditions in which a densely concentrated compact is obtained.

As a result of the above experiments, it was revealed that it is difficult to produce a sintered diamond compact which has a uniform structure consisting of diamond particles finer than one micron by the conventional methods known to the art.

It is therefore an object of the present invention to obviate the above defects, and to provide a sintered compact for a cutting tool having uniform structure constructed by diamond particles finer than one micron.

It is an another object of the present invention to provide a method of producing a sintered compact which has a uniform structure with diamond particles finer than one micron.

Other objects and features of the present invention will be apparent from the following description of the invention with reference to the accompanying drawings, in which.

Figure 11:
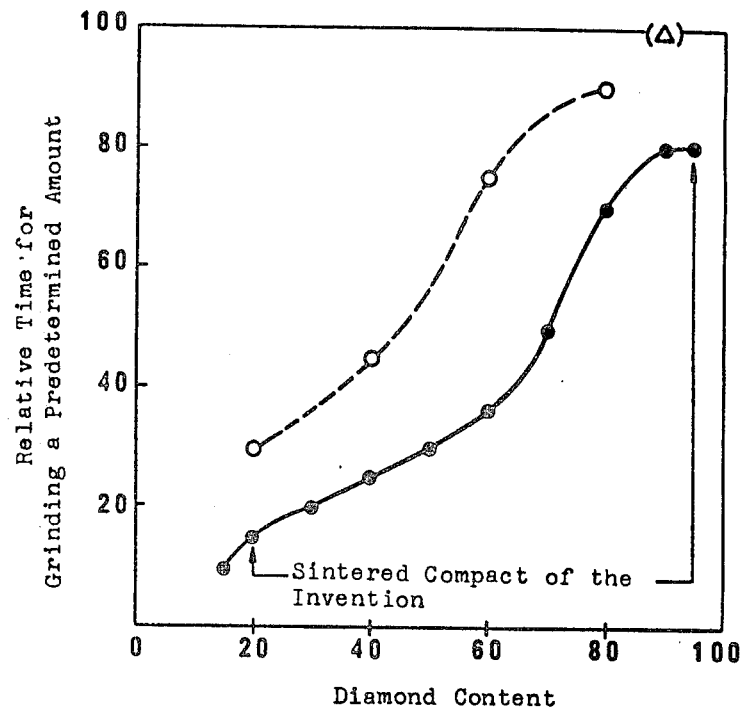
Figure 12:
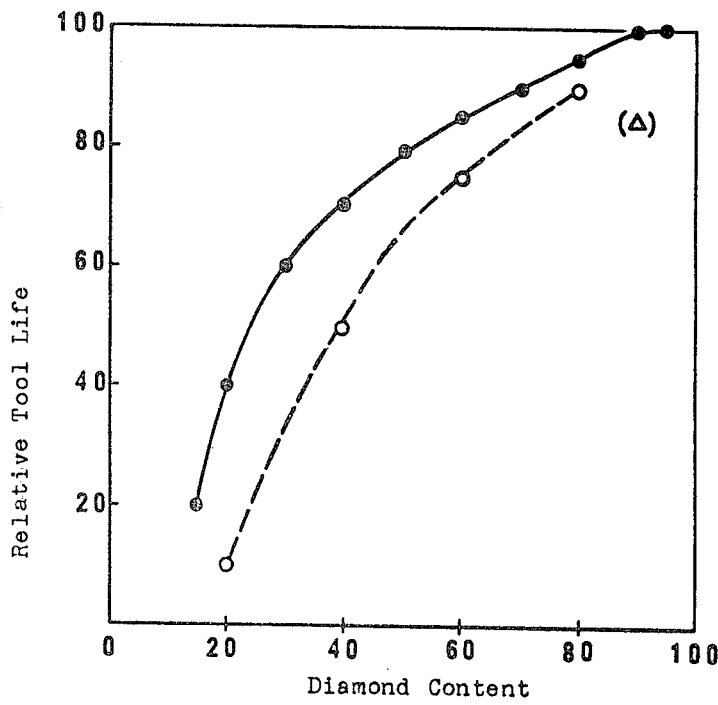

FIG. 11 is a chart showing grindability in terms of a relative time required for grinding a predetermined amount, in which solid circles are sintered compact of the present invention which is produced from a diamond powder finer than one micron bonded by WC-Co cemented carbide, and open circles are sintered compacts for comparison which are produced from a diamond powder of average particle size of 6 micron bonded by WC-Co cemented carbide, and an open triangle is a marketed diamond compact with a binder of cobalt; and FIG. 12 is a chart showing a tool life in terms of development of flank wear in relation to a cutting time upon cutting Al-13% Si alloy by using a cutting tool of FIG. 11.

The inventors have made further studies as to the method of producing a sintered compact comprising finer diamond particles. As a result, it was found that the sintered compact which meets the objects of the present invention can be obtained by using a cemented carbide mainly composed of WC or WC with a slight amount of iron group element, as a binder.

The reason why WC is selected as a binder is as follows: It is of course important to utilize the properties of diamond such as very high hardness, rigidity, wear resistance and highest heat conductivity among all materials, for applying a sintered diamond compact to a cutting tool. However, there are a number of difficult technical factors so as to obtain a sintered compact comprising pure diamond since the pressure and temperature required for the sintering is tremendously high. For this reason, the diamond powder is sintered by using a suitable binder under super-pressures, but it is necessary to select a binder which will not injure the excellent properties of diamond.

WC has the highest rigidity next to diamond or cubic boron nitride, and has a high heat conductivity. As for the heat expansion coefficient which is an another important factor in producing a complex compact containing diamond, WC has almost the same value as diamond. Further, in view of the fact that the internal residual stress will not remain in the sintered compact, WC is an excellent material.

Still further, as to the wear resistance, WC is of course superior to metal binders such as cobalt, but in respect to heat resistance and wear resistance at high temperature, the material may be inferior to some other materials. However, since diamond is unstable at high temperature, the heat resistance of a binder is not so important in this respect.

In consideration of the above points, WC is especially suitable for a binder of a sintered compact of diamond.

Other material having the properties similar to WC is (MoW)C which is obtained by replacing a part or almost all of W in WC by Mo, and which has the same crystal structure as WC. One of the inventors has made detailed studies on the properties of a cemented carbide using this compound, and it was confirmed that the properties such as hardness, rigidity, wear resistance, heat conductivity and heat expansion coefficient of carbides formulated, for example, as $(Mo_7W_3)C$ or $(Mo_5W_5)C$ are almost similar to WC. Further, the cemented carbides mainly composed of these complex carbides can be more plastically deformable before fracture, and have higher toughness as well as lower friction coefficient all of which are important properties when used as a cutting tool, as compared to WC-Co cemented carbide.

Although all the description hereinafter is referred to only WC, the above (MoW)C carbides can also be used quite similarly to WC in the present invention.

Figure 1:
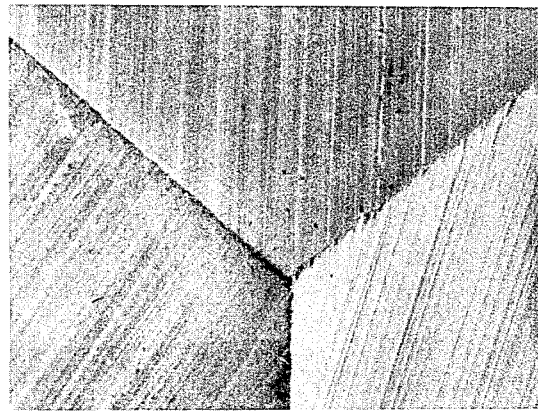
FIG. 1 is a microphotograph of a cutting edge formed from a marketed ultrafine WC base cemented carbide.
Figure 2:
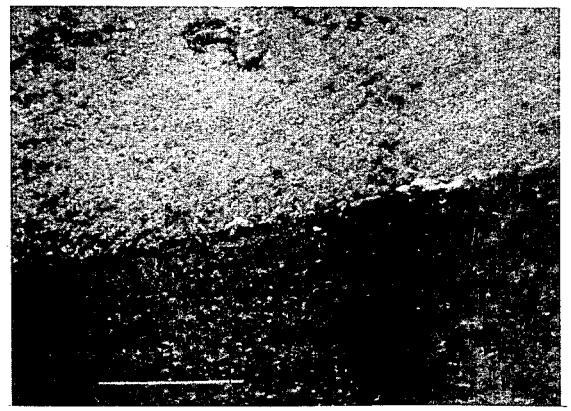
FIG. 2 is a microphotograph of a cutting edge formed from a sintered diamond compact having a particle size from 3 to 10 micron.
Figure 3:
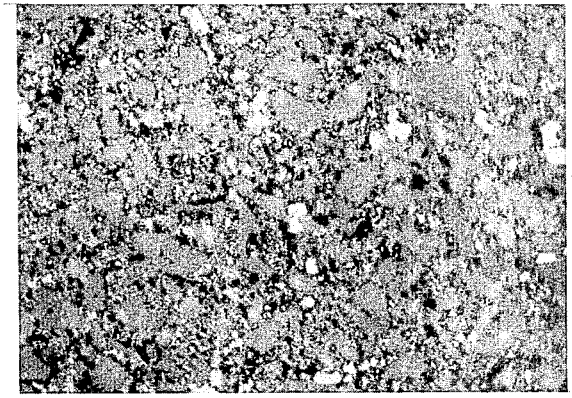
FIG. 3 is a microphotograph showing a structure of a sintered diamond compact of FIG. 2, a metal binder mainly composed of cobalt looking white, while diamond crystals looking grey.
Figure 4:
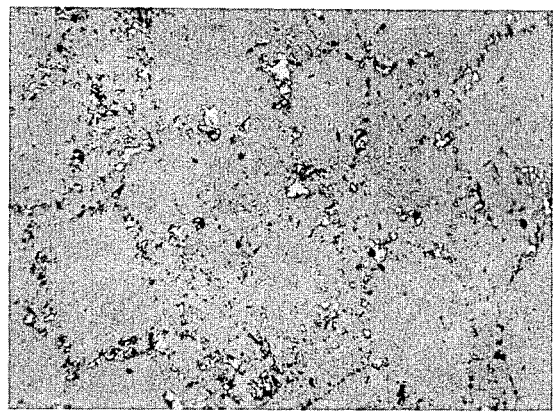
FIG. 4 is a microphotograph showing a structure of a marketed diamond compact which is used as a wire drawing die, diamond crystals looking grey in contact to one another, while a binder metal mainly composed of cobalt looking white.
Figure 5:
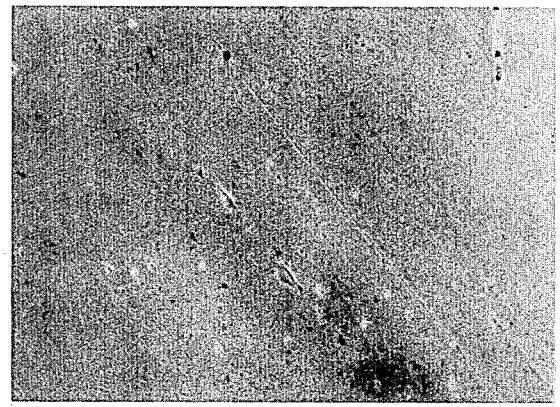
FIG. 5 is a microphotograph showing a surface condition of a copper wire with a diameter of 0.5 mm which is produced by a die formed from a single crystal natural diamond.
Figure 6:
FIG. 6 is a microphotograph showing a surface condition of a copper wire which is produced by a die made from a marketed sintered diamond compact.
Figure 7:
FIG. 7 is a microphotograph showing the inner face of a die of FIG. 6 after using, the grey particles being diamond, a wide black area being a torn-off portion of diamond particles.
Figure 8:
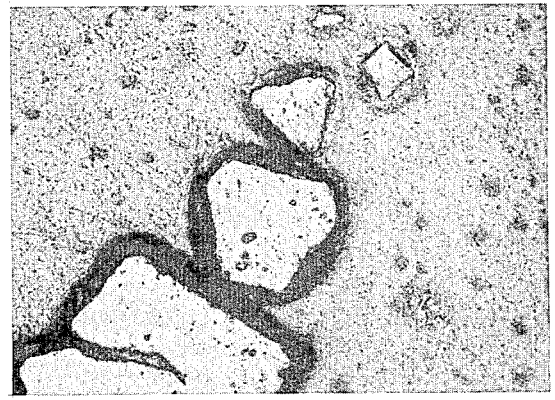
FIG. 8 is a microphotograph showing a structure of a diamond compact which is sintered from a fine diamond powder by a conventional method, the structure presenting numerous diamond crystals which abnormally grow to several hundred microns.
Figure 9:
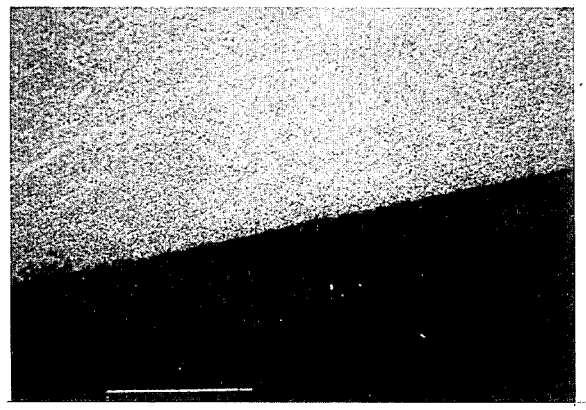
FIG. 9 is a microphotograph showing a cutting edge which is formed by grinding ultrafine sintered diamond compact of the present invention in the same manner as that of FIG. 2.
Figure 10:
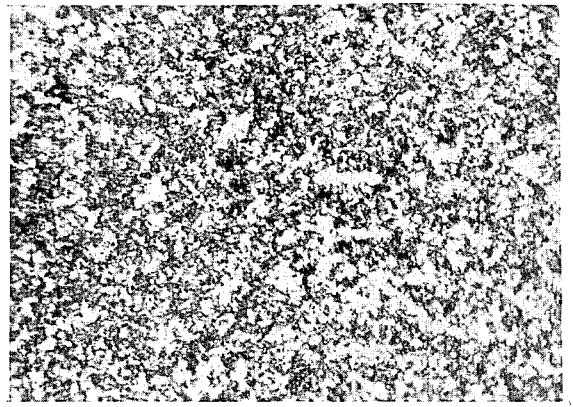
FIG. 10 is a microphotograph showing a structure of a sintered compact of the present invention, fine grey particles being diamond, white binder portion consisting of WC particles less than one micron.

The tool material according to the present invention is a sintered compact which has a uniform structure consisting of diamond particles finer than one micron bonded by a carbide finer than one micron mainly composed of WC. Since diamond particles as a hard component finely and uniformly disperse in the compact, when the material is formed into a cutting tool by grinding, a cutting edge thereof can be very sharp without any roughness. An example of the cutting edge is shown in FIG. 9. The sintered compact comprises 60 volume % of diamond and the balance WC finer than one micron. FIG. 10 is a microphotograph showing a structure of this. In order to obtain a sintered compact which has sharpness at a cutting edge as appears from the photographs, WC binder should be also finer than one micron in particle size.

When the sintered compact of the present invention is used as a cutting tool, it can be applied to a far wider field than a conventional compact since the compact of the present invention has sharpness at a cutting edge, provides a smooth machined surface, has a smaller chipping at a cutting edge due to the tough WC binder, and has a smaller cutting force because of the sharper cutting edge which makes possible the use under the same conditions as cemented carbide cutting tools.

The amount of diamond contained in the sintered compact of the present invention ranges from 95 to 20 volume %, and can be varied within the range according to the uses thereof. In a cutting tool of interrupted cutting which particularly requires toughness, a binder-rich compact should be selected at some sacrifices of wear resistance.

When diamond content is less than 20 volume %, there is no advantage in respect to cost as well as tool life of a cutting tool which is made from a sintered compact produced by a super-pressure apparatus.

Most preferable amount of diamond contained in the compact ranges from 70 to 30 volume %. As explained in the following Example 6, the diamond particles are not in contact to one another in this range. Therefore, the grindability is considerably improved. Moreover, when the cutting tool of the sintered compact is used for cutting relatively soft Al alloy or Cu alloy, the wear resistance thereof will be little reduced, exhibting excellent properties.

When the sintered compact of the present invention is used as a wire drawing die, since the surface of the die is finished highly smoothly, it provides a smaller drawing force which makes it possible to draw a finer and weaker metal wire without difficulty. Further, the surface of a wire can be highly smooth since there occurs little destroy or tearing-off of the diamond particles of the die.

Meanwhile, the reason why a sintered compact which has a uniform structure consisting of ultrafine diamond particles less than one micron can be obtained by the method of the present invention is as follows: A diamond particle has a very high hardness, and is difficult to deform. Therefore, when it is compressed under super-pressures, there remain clearances between diamond particles. The finer the diamond particles, the more the clearances. In any sintered compact produced according to the before-mentioned Japanese Patent Publication No. 39-20483 or 52-12126, the finer is the diamond powder material, the more binder metal should be added, or the more binder permeates into the sintered compact as a result of sintering. The sintering of a diamond compact according to these methods is performed through the liquid phase of an eutectic mixture of carbon of diamond with iron group element, and proceeds with dissolution of diamond into and precipitation thereof from the eutectic mixture. Especially, fine diamond particles have a large surface energy which causes crystal growth, similarly to an ordinary liquid phase sintering. When abnormal crystal growth occurs upon sintering diamond, there exists about diamond particles a liquid phase sufficient to dissolve them, but no other substances which prevent the crystal growth.

According to the present invention, however, clearances between diamond particles finer than one micron are filled with finer WC particles, and by sintering the mix under super-pressures, it is possible to obtain a completely dense compact without necessity of liquid phase. Since there exists little liquid phase which is essential for the crystal growth of diamond, and since WC particles fill between diamond particles, the crystal growth is completely despressed during sintering the diamond.

If desired, as a binder for diamond particles can be used WC cemented carbide which contains, together with WC, a slight amount of iron group element. In this case, a slight amount of liquid phase which contains an iron group element in the cemented carbide makes it possible to obtain a sufficiently dense compact. WC particles in the cemented carbide prevent the complete adhesion between diamond particles to depress the crystal growth. On the other hand, since the adhesion between diamond and WC is strong, there can be obtained ultrafine sintered compact with a tough binder of cemented carbide.

In practice, in order to produce the compact of the invention comprising diamond and WC crystals finer than one micron, it is convenient to mix diamond and WC powder by wet ball-milling by using cemented carbide balls in a pot having a cemented carbide lining. Further, an attritor or vibration milling can be employed in the same manner as ball-milling. The mixing operation may be performed for 30 minutes to one week so as to pulverize the material finely.

Since diamond is very hard, a relatively large amount of abraded powder from the balls and pot lining mixes in the diamond powder. Therefore, it is convenient to use this as a binder component, especially if the composition of the balls and lining are the same as that of a binder.

In the compact of the present invention, a liquid phase produced during sintering should be minimized. Further, since the binder should have a rigidity, it is not preferable to add too much amount of metal into a binder. If the metal is cobalt, 15 weight % is maximum. As a metal other than cobalt, iron, nickel or an alloy of cobalt, nickel or iron may be used.

The main component of binder should be WC, but other carbides such as TiC, ZrC, HfC, TaC and NbC can be substituted for a part of WC in the range less than 50 volume %.

A marketed natural or artificial diamond powder for lapping can be used as a material for the sintered compact of the present invention. The material with a particle size coarser than one micron can be pulverized by using cemented carbide balls and pot as mentioned before.

When it is necessary to uniformly mix a diamond and WC into a mixture finer than one micron, the ball-milling is most preferable as described before. In this case, however, since cemented carbide balls and pot are used, a slight amount of binder metal contained in the cemented carbide inevitably mixes. In order to depress the crystal growth of diamond during sintering, it is preferable to minimize the amount of such a metal. When a large amount of metal is mixed, the powder can be treated in a hydrochloric acid solution to dissolve and remove the metal.

Hot-pressing should be performed under the conditions of temperature and pressure within the stable range of diamond. This range is well-known as Berman-Simon equilibrium line. Generally, the sintering is performed at 1200° to 1600° C. under 40 to 80 Kb for 5 to 60 minutes.

Meanwhile, upon sintering the diamond compact of the present invention, it is necessary to depress the crystal growth of diamond in every way. According to an experiment, when there exists in a binder a slight amount of iron group element such as Co, Fe or Ni together with WC, crystals of diamond and WC tend to grow if the temperature is too high. However, the conditions for producing the sintered compact consisting of diamond and WC particles finer than one micron are at temperatures over the liquid phase generating point of eutectic mixture comprising iron group element, diamond and WC, but within the range of 100° C. over the point. If the metal content in the binder is previously removed by acid as mentioned before, higher temperatures may be applied.

Since the materials of the sintered compact are very fine, a large amount of gas adsorbs thereon. Therefore, it is necessary to degas by heating the materials in vacuum at temperatures higher than 300° C. When the temperature is lower than 300° C., the treatment requires a longer time, and is not industrially applicable.

The powdered mix for producing the sintered compact of the invention can be cold-pressed into a green compact before sintering, at a room temperature under the pressure of 200 Kg/cm$^2$ to 2 t/cm$^2$.

In order to illustrate the present invention, references are now to be made to the following Examples. Throughout the Examples, percentages are the percentages by weight unless otherwise specified.

EXAMPLE 1

Ultrafine diamond powder having a particle size finer than one micron was pulverized in a solvent of acetone by using WC-7% Co cemented carbide balls and a pot having the same cemented carbide lining. The amount of diamond was 5 g, but after 40 hours of ball-milling, the powder weight 8.3 g. This increase was caused by the fine cemented carbide powder abraded from the balls and pot.

The diamond amount contained in the powder mix was estimated to be 80 volume %. As a result of examination by a scanning electron microscope, it was confirmed that all the particles in the mix were finer than one micron.

The powder mix was cold-pressed into a disk having a thickness of 1.5 mm and diameter of 10 mm. The disk was treated in a vacuum furnace at 1000° C. to degas, and thereafter was sintered under 55 Kb at 1370° C. for 10 minutes by means of a super-pressure apparatus for making a diamond.

The sintered compact was lapped by a diamond paste, and the structure thereof was examined to be found that the compact comprises ultrafine diamond and WC particles less than one micron in size.

The compact was cut. A piece thereof was brazed to a steel shank, and a cutting edge was ground by a diamond wheel. For comparison, a cutting tool of the same shape was made from a marketed sintered diamond compact.

The ground cutting edges were observed. The cutting edge of the marketed compact had a number of chippings with a width of about 10 micron, which might be caused during grinding.

A copper alloy commutator of an electric motor was cut by both of the cutting tools at a cutting speed of 400 m/min., depth of cut of 0.5 mm and a feed of 0.05 mm/rev. After cutting 2000 pieces by the cutting tool of the invention, the surface roughness of a workpiece was 1.3 micron at maximum, while a workpiece cut by the cutting tool of marketed compact had initial surface roughness of 2.6 micron at maximum, and after cutting 500 pieces, the surface roughness reached 3.9 micron.

EXAMPLE 2

A diamond powder material same as Example 1 was pulverized for 120 hours by using the same cemented carbide balls and pot as Example 1. A diamond powder of 5 g became 19.2 g by the increase of 14.2 g. The composition of powder was estimated to be 60 volume % of diamond and the balance WC-7% Co. A metal component was dissolved and removed from the powder mix by a diluted hydrochloric acid.

After cold-pressing the powder mix, it was subjected to degassing in the same manner as Example 1.

Further, there were prepared a WC-10% Co cemented carbide disk having a thickness of 3 mm and diameter of 10 mm together with a molybdenum disk having a thickness of 0.05 mm and diameter of 10 mm. The green compact containing diamond was put on the molybdenum disk under which was disposed the cemented carbide disk. The assembly was inserted in a super-pressure apparatus, and sintered in the same manner as Example 1.

The sintered compact was cut, and the sectioned face was examined to be found that a sintered compact with a thickness of 1 mm containing ultrafine diamond particles firmly engages the cemented carbide disk through the intermediary of a 50 micron thick layer consisting of molybdenum carbide. The structure of the sintered diamond part is shown in a microphotograph of FIG. 10.

Cutting tools were prepared from the sintered compact of the invention and a marketed sintered compact of which the particle size of diamond is 3 to 10 micron. A round bar of Al-18% Si alloy having longitudinal slits was cut by the cutting tools at a cutting speed of 500 m/min., depth of cut of 0.13 mm and a feed of 0.05 mm/rev. After 30 minute cutting by the tool of the invention, the flank wear width was 0.15 mm which was normal, while the cutting tool made from the marketed compact had a 0.5 mm wide chipping at the flank after 30 minute cutting.

The machined surface of a workpiece cut by the tool of the invention had a roughness of 1.6 micron at maximum in the initial stage of cutting, while the surface cut by the marketed compact was 2.6 micron at maximum.

EXAMPLE 3

There were prepared two kinds of powders by pulverizing a diamond powder with particle size of 3 to 6 micron for 5 hours and for 25 hours, respectively, in the same manner as Example 1. The former contained 32.1% of WC-7% Co cemented carbide and about 90 volume % of diamond. The latter contained 86.5% of cemented carbide and 40 volume % of diamond.

Both of the powder mix were sintered in the same manner as Example 1 to obtain sintered compacts having a diameter of 3 mm and thickness of 1.5 mm. As a result of examination, it was confirmed that both compacts consist of diamond and WC particles finer than one micron. The compacts were formed into dies having a hole of 0.5 mm of diameter. A similar die was prepared from a marketed compact having coarser diamond particles of about 60 micron.

Aluminium wire was used as a material to be drawn, and the drawing force of each die was measured using a spindle oil as a lubricant. The die of marketed compact exhibited 15.1 Kg/mm$^2$ of drawing force, the die containing 90 volume % of diamond of the invention being 12.1 Kg/mm$^2$ smaller than the former, the other die of the invention being 13.8 Kg/mm$^2$. Further, the surface of drawn wires were compared to one another. The wires drawn by the dies of the invention had less scratches than those drawn by the die of marketed compact, especially the wires drawn by the die of the invention containing larger amount of diamond had fewer surface scratches.

EXAMPLE 4

4 g of diamond powder of Example 1 added with 1 g of TaC powder having a particle size of 3 micron was pulverized for 120 hours by using balls and pot consisting of $(Mo_7W_3)C$-10% Co-5% Ni alloy. After the ball-milling, the powder weight 15 g. A metal component mixed was removed in the same manner as Example 2. The powder mix comprised 65% of diamond, 32% of $(Mo_7W_3)C$ and 3% of TaC, all on the volume base.

The powder mix was sintered in the same manner as Example 2 under 55 Kb at 1450° C. for 10 minutes to obtain a sintered compact bonded to a cemented carbide disk through the intermediary of molybdenum carbide layer. The obtained compact was a ultrafine alloy having a uniform structure consisting of fine diamond particles less than one micron, $(Mo_7W_3)C$ finer than one micron and a slight amount of TaC.

EXAMPLE 5

5 g of diamond powder having a particle size of 2 to 6 micron was pulverized for 72 hours by using WC-8.1% Co cemented carbide balls and pot. The obtained powder weighed 36.8 g by the increase of 31.8 g of cemented carbide fine powder abraded from the balls and pot during ball-milling.

The analysis of the powder mix revealed that it comprises 40 volume % of diamond, 51.7 volume % of WC and 8.3 volume % of Co. After heat-treating the mix so as to degas in the same manner as Example 1, it was sintered under 55 Kb at 1400° C. for 10 minutes by a super-pressure apparatus in the same manner as Example 2. The obtained compact was examined by a microscope to be found that diamond particles finer than one micron uniformly disperse in the structure and WC particles in the binder of WC-Co alloy are finer than 0.5 micron. Vickers hardness of the compact was 3300 Kg/mm$^2$.

The compact was cut and brazed to a steel shank to form a cutting tool. For comparison, cutting tools of the same shape were prepared by using a single crystal natural diamond and a marketed sintered compact having diamond particles of 3 to 10 micron, respectively. A piston of engine consisting of Al-Si alloy was cut at a cutting speed of 250 m/min, depth of cut of 0.2 mm and feed of 0.15 mm/rev. The cutting tool formed from the compact of the invention exhibited the performance equivalent to that formed from natural diamond in both the surface roughness and dimension precision. Further, 3600 pieces were cut by the cutting tool of the invention before the tool life expires, while 1800 pieces by the cutting tool made from the natural diamond due to chipping at the cutting edge. On the other hand, the cutting edge made from the marketed sintered compact did not exhibit sharpness at the initial stage of cutting, and could not be applied to actual use since the machined surface was too rough.

EXAMPLE 6

In order to examine the grindability characterizing the compact of the invention as well as the relation between the tool life and composition, various compacts were prepared by varying particle size of diamond powder and amount thereof.

There were prepared two kinds of sintered compacts, one having a particle size of about 6 micron and the other finer than one micron, each of compacts containing different amount of diamond, by adjusting a particle size of diamond powder material, amount thereof before putting in a ball-milling pot, number of cemented carbide balls, and a time for ball-milling. As a binder, solely WC-8% Co alloy was used. The sintering conditions were the same as Example 5.

The grindability was examined with respect to each of the sintered compacts with a diameter of 10 mm different in particle size and diamond content.

The time required for grinding the compact by 0.1 mm in the direction of thickness was measured by using a diamond wheel (270/300 mesh of diamond grain size) attached to a surface grinding machine at a wheel surface speed of 1700 m/min and grinding depth of 0.002 mm/path. FIG. 11 shows the results. In the chart, open triangle is the marketed diamond compact, solid circles being the compacts containing diamond particles finer than one micron, open circles being the compact for comparison containing diamond particles of about 6 micron. The times are relative time when the time required for grinding the marketed compact by 0.1 mm was regarded as 100. As seen, the grindability of the compacts of the present invention were remarkably improved.

FIG. 12 shows the results of cutting time required for reaching a predetermined wear width by using the cutting tools formed from the same compacts as FIG. 11 upon cutting Al-13% Si alloy. As apparent, the smaller the amount of diamond in the compacts, the shorter the tool life. However, as is noted in consideration of FIG. 11, the sintered compact of the invention containing diamond particles finer than one micron exhibited better grindability as well as better wear resistance when used as a cutting tool, as compared to the sintered compacts of coarser diamond particles.

When the sintered compact of the invention contains less than 70 volume % of diamond, the grindability is remarkably improved, as shown in FIG. 11. The reason is that the diamond particles in the structure of the compact are not contact with each other.

What we claim is:

1. A sintered compact for use in a cutting tool comprising 95 to 20 volume % of diamond finer than one micron in size, and the balance binder of a carbide selected from the group of WC and (MoW)C, both finer than one micron in size.

2. A sintered compact for use in a cutting tool comprising 95 to 20 volume % of diamond finer than one micron in size, and the balance binder of a cemented carbide selected from the group of WC base cemented carbide and (MoW)C base cemented carbide, both finer than one micron in size.

3. A sintered compact as claimed in claim 1, wherein the binder is added with one of carbide selected from the group of TaC, ZrC, HfC, TiC and NbC, the amount being less than 50 volume % of the binder.

4. A sintered compact as claimed in claim 1, wherein the diamond is 70 to 30 volume %.

5. A sintered compact as claimed in claim 2, wherein the binder is added with less than 50 volume % of a cemented carbide selected from the group of TiC, ZrC, HfC, TaC and NbC base cemented carbides.

* * * * *